United States Patent [19]

House et al.

[11] 4,418,101

[45] Nov. 29, 1983

[54] METHOD OF MAKING THERMOPLASTIC HARDBOARD FROM ACETYLATED MAT

[75] Inventors: Cynthia B. House, Arlington Heights, Ill.; Robert J. Leichti, Auburn, Ala.

[73] Assignee: United States Gypsum Company, Chicago, Ill.

[21] Appl. No.: 453,859

[22] Filed: Dec. 27, 1982

Related U.S. Application Data

[62] Division of Ser. No. 213,263, Dec. 5, 1980, Pat. No. 4,388,378.

[51] Int. Cl.³ .................... B32B 23/04; D21F 11/00
[52] U.S. Cl. .................... 427/393; 427/397; 427/254; 428/537; 428/541; 162/125; 162/221; 162/150; 162/182; 162/157.7
[58] Field of Search ............................. 427/393, 397

[56] References Cited

U.S. PATENT DOCUMENTS

| | | | |
|---|---|---|---|
| 2,215,244 | 9/1940 | Linzell | 162/206 X |
| 2,417,995 | 3/1947 | Stamm et al. | 427/254 X |
| 3,094,431 | 6/1963 | Goldstein et al. | 427/393 X |

FOREIGN PATENT DOCUMENTS 391950 12/1973 U.S.S.R.

*Primary Examiner*—P. Ives
*Attorney, Agent, or Firm*—Samuel Kurlandsky; Robert H. Robinson; Kenneth E. Roberts

[57] ABSTRACT

A wet-felted mat of wood fibers is acetylated by coating the mat with a quantity of acetic anhydride ranging from 5 to 70% by volume of the mat and heating the mat at a temperature of from 150° to 300° F. while confining substantially all of the acetic anhydride within the mat for about 20 to 120 minutes. The acetylated mat is pressed into hardboard which may be bent into a variety of loops, spirals, helices, and other curvilinear shapes to make articles of furniture, protective packaging products and the like.

9 Claims, No Drawings

METHOD OF MAKING THERMOPLASTIC HARDBOARD FROM ACETYLATED MAT

This application is a division of application Ser. No. 213,263, filed Dec. 5, 1980, now U.S. Pat. No. 4,388,378.

This invention relates to a thermoplastic hardboard having a high modulus of rupture, a high modulus of elasticity, and resistance to swelling when used in applications which require it to be in contact with water over long periods of time. This invention also relates to a method for making such a hardboard from a preformed mat of wood fibers. More particularly, the invention relates to a novel method of acetylation whereby the fibers in the mat are plasticized to such an extent that hardboard pressed from such mat may be bent through tight 360° curves without splitting.

The manufacture of hardboard is well known in the art. Methods for making it are described in U.S. Pat. Nos. 2,215,244; 2,234,126; and 2,388,487, among others.

In general, hardboard is made by the heat-and-pressure-consolidation of a mat having a density of from about 10 to about 35 lbs./cu. ft. and a thickness of from about ¼ inch to about 2 inches to a board having a density of from 31 to about 80 lbs./cu. ft. and a thickness of from about 1/16 to about ½ inch. The mat is formed from a pulp of natural or partially cooked lignocellulose fibers on a Fourdrinier or cylinder machine. The pulp usually contains a drying oil such as linseed or tung oil which is precipitated onto the fibers with an acidic salt such as ferric sulfate.

Hardboard, however, like other wood products, suffers from poor dimensional stability when used in areas of high humidity. Actual physical deterioration occurs when hardboard remains in contact with liquid water for even a relatively short period of time. Several techniques for overcoming such deficiencies, for example, treating the surface with water-resistant resins or impregnating the board with thermosetting resins, have been proposed.

In 1947, Stamm and Tarkow, in their U.S. Pat. No. 2,417,995, taught two methods for the acetylation of wood veneers, wooden boards and other porous lignocellulosic composition boards to impart dimensional stability to such boards without breaking down their physical structure. The board is either soaked in liquid acetic anhydride and heated under pressure at from 165° F. to 220° F. for up to 16 hours or it is suspended for 8 to 16 hours in the vapor of acetic anhydride being circulated within a kiln which is held at a temperature of 175° F. to 230° F. In both methods, large excesses of acetic anhydride are used.

In two publications, Svensk Papperstidning 68, 583 (1965) and Tappi 49, (1), 23 (1966), Tarkow and his collaborators taught that the vapor phase acetylation of hardboard having a density of about 60 lbs./cu. ft. (1g/cc) improves the dimensional stability of the hardboard. They also report, however, that the acetylation, itself, causes a pronounced expansion in the thickness of the board as well as some expansion in the plane of the board. Acetylation to an apparent acetyl content of 16%, according to their findings, is accompanied by an increase in thickness of from 12% to 19%. The initial thickness of the hardboard was 0.125 inch; the final thickness could thus be about 0.15 inch. The authors teach that the surface of the hardboard is roughened and that pronounced bleaching occurs.

Numerous other workers in the field have published their findings on the acetylation of hardboard and on the acetylation of the wood fiber pulp before it is formed into a mat.

None of these publications, however, have reported any investigation of the acetylation of the mat of wood fibers before it is pressed into hardboard.

Now, it has been discovered that important advantages from both the processing viewpoint and the product viewpoint are gained when the mat is coated with an amount of acetic anhydride calculated to cause the desired degree of acetylation and then confined in a heated space for a short time.

It is an object of this invention to provide a novel method for the preparation of acetylated hardboard. It is another object of this invention to provide a novel insulation board.

It is another object to provide a thermoplastic hardboard having a high modulus of elasticity and a high modulus of rupture.

It is another object to provide a hardboard which may be shaped into acutely curvilinear articles of manufacture.

It is a further object to provide a process for the acetylation of wood fibers wherein the destructive action of by-product acetic acid is minimized.

It is yet another object of this invention to provide a process for the production of acetylated hardboard wherein discoloration of the product is avoided.

Still further objects of the invention will become apparent from the following description of the process and the product thereof.

Said objects are accomplished by a novel process which comprises the steps of removing substantially all of the water from a mat of wood fibers, coating the mat with an amount of acetic anhydride equal to from about 35% to about 120% of the weight of the mat, enclosing the mat in a sealed space, and heating the enclosed mat to a temperature within the range of from about 150° F. to about 300° F. for from about 20 minutes to about 120 minutes. Acetic acid is formed as a by-product of the esterification of hydroxyl groups on the non-crystalline cellulose, hemi-cellulose, and lignin portions of the wood fibers by the acetic anhydride. Said by-product and the small amounts of unreacted acetic anhydride are removed in any satisfactory manner such as heating the mat as atmospheric or reduced pressure and drawing off the liberated vapors through an exhaust system or by washing the mat with water and drying it. It is desirable to minimize the residence time of the destructive acetic acid as much as practicable.

The amount of acetic anhydride used is that which is calculated to cause a certain weight gain in the mat, assuming a 100% conversion. Thus, the amounts represented by the 35% to 120% range given above are those required to obtain a target weight gain of from about 12% to about 33%, based on the final weight of the acetylated mat. The calculation is based on the fact that the only one acetyl moiety is available from each molecule of acetic anhydride and thus the acetyl moiety constitutes only 43 parts of each 102 parts (1 mole) of acetic anhydride.

A target weight gain of from about 20% to about 25% is much preferred. Such a target requires the application of an amount of acetic anhydride ranging from about 60% to about 80% of the mat weight. The conversion efficiency in this range is much greater than at the higher target values and is about the same or slightly less than at the lower target values. For example, a mixed hardwood fiber (no oak) mat treated to give a theoretical weight gain of 20% actually gained 14.7% whereas a mat of the same composition gained only 15% when the target was 30% and at a target gain of 14% the actual gain was 10%. Actual weight gains of from about 12% to about 18% are achieved when softwood mats are acetylated but the use of more than 120% of acetic anhydride is deemed uneconomical. Furthermore, the potential for destrtive acetylation of hemi-cellulose, lignin and crystalline cellulose is increased.

The mat, whose initial thickness is usually at least ¼ inch and may be 2 inches or more, may be coated by brushing or rolling the liquid anhydride on its surface or by spraying a measured amount onto the mat or by simply blotting up a thin layer of a measured amount of the anhydride contained in a shallow pan having an area approximately the same as that of the mat. The full amount may be coated on one face of the mat or it may be distributed over both faces. The mat is usually treated soon after it is dried to a moisture content of about 2% or less in a drying oven and thus is considered to be substantially dry. Coating of the mat at room temperatures gives satisfactory results but it is preferred to coat the warm mat, e.g., at about 250° F.

In the process of this invention, the volume of acetic anhydride is from about 5% to about 70% of the mat volume, even at 250° F. Substantially all of it is retained within the mat during the first heating step. By confining the acetylating agent in such manner and distributing it evenly on the mat, the destructive effects of large localized excess amounts of liquid anhydride are avoided while an efficient acetylation is taking place.

The coated mat may be wrapped in a substantially inert and impervious sheet material such as aluminum foil in order to provide a seal between the acetic anhydride vapor and the surrounding atmosphere. Enclosure of the mat in a sealed space may also be accomplished by placing the coated mat in a shallow oven having a length, width and height just slightly larger than the respective dimensions of the mat. Several mats may be stacked up on racks in a larger oven but the free space around the mats is kept to the minimum which still allows unobstructed insertion of the racks into the oven. The oven may be equipped with spray heads through which metered amounts of anhydride are evenly distributed on the mat and exhaust ports through which by-product acetic acid and residual anhydride may be withdrawn upon the completion of the desired reaction period. Obviously, the use of such spray heads is an option to the pre-coating of the mat before it enters the oven. Likewise, the mat may be dried in the same oven before being coated.

Preferably, the acetylation reaction is carried out at temperature of from about 225° F. to about 275° F. A temperature of about 250° F. is especially preferred. This is below the boiling point of acetic anhydride but slightly above that of the by-product acetic acid.

The period of time during which the acetylation is allowed to proceed depends upon the temperature of the reaction, the weight gain desired and the source of the wood fiber. Western pine, red oak, white oak, tulip, and sweet gum are examples of the species contemplated. Softwoods are easier to acetylate than hardwoods and the reactivity of individual species within each group varies significantly. Usually, however, the desired level of acetylation may be attained in from about 30 minutes to about 90 minutes. It is preferred, however, to heat the coated mat for at least about 60 minutes.

As noted above, the pulp used in the formation of a mat to be pressed into hardboard usually contains a drying oil and a salt such as ferric sulfate which causes the drying oil to precipitate onto the wood fibers to act as a binder. Because it is much more convenient to incorporate the drying oil into the mat before rather than after its formation, the mat acetylated according to the method of this invention usually will contain the drying oil and the concomitant salt. Although metallic salts are known to have a catalytic effect on the acetylation reaction, such salts are not necessary to the success of the method of this invention.

The acetylated mat may be used to advantage wherever structural insulation board has been used previously as sound deadening board, building board, insulating form board, sheathing, shingle backer, roof insulating board, ceiling tile and panel, insulating roof deck, and insulaing wallboard. It is particularly useful in places where water swelling might otherwise be feared. Even though the acetylated mat may absorb water weighing as much as 30 to 50% of its weight upon immersion, its thickness increases less than 5%. The mat remains intact after 500 hours of immersion whereas a non-acetylated mat disintegrates after only a short time under water. Moreover, in contrast to the pronounced expansion in thickness of hardboard upon acetylation reported by Tarkow et al, the swelling of the mat upon acetylation by the method of this invention is negligible.

Alternatively, the mat may be controlled by heat and pressure in the conventional manner to form hardboard having a smooth, hard surface. After the mat has been acetylated and the acetic acid and residual anhydride has been removed either by heating it or by washing it with water and then drying it, it is compressed between the heated platens of a press at a temperature of from about 400° F. to about 500° F. and a pressure ranging from about 1000 p.s.i. to about 3000 p.s.i., depending upon the density desired. The thickness of the hardboard is determined by placing the appropriate stops between the platens. The pressure is applied for about 1 or 2 minutes. Thicknesses ranging from less than 0.03 inch to more than 0.6 inch may be specified and obtained in contrast to the uncertainty arising from the swelling of pre-pressed board when it is acetylated.

The following examples and comparative data are given to more fully illustrate the invention and to demonstrate the advantages of the process and the product.

EXAMPLE 1

Eight samples of a mixed hardwood fiber mat, and eight samples of a mixed softwood fiber mat, each 11"×11"×½" and containing 0.7% tung oil and 0.5% ferric sulfate, are heated at 250° F. (121° C.) for 1 hour to drive off substantially all moisture. Four of the hardwood mats and four of the softwood mats are acetylated while the others are kept as controls. Acetic anhydride is brushed on the top and bottom surfaces of each of the eight test mats while the mats are still warm from the drying process. All of the mats, coated and not coated, are wrapped tightly in aluminum foil and the foil is sealed. Each mat is heated at 250° F. for 1 hour and then unwrapped and placed in a ventilated oven for 2 hours at 250° F. to remove acetic acid and residual anhydride.

Each mat is then pressed between two platens at a temperature of from about 485°–490° F. (about 250°–255° C.).

The initial weight of the dried mats, the total amount of acetic anhydride (A.A.) used, the final weight of the mats, the apparent acetyl content (weight change: final weight × 100%) of the treated mats, as well as the platen pressure and the density and thickness of the hardboard produced from each are given in Table I. The theoretical acetyl content is approximately 20 percent.

TABLE I

|  | MAT | | | | HARDBOARD | | |
| --- | --- | --- | --- | --- | --- | --- | --- |
|  | Dry Wt. (Grams) | Wt. A. A. (Grams) | Final Wt. (Grams) | % Acetyl | Density (lbs./cu.ft.)* | Thickness (Inch)** | Pressure (p.s.i.)*** |
| A (Hardwood) | 254 | 155 | 292 | 13.0 | 61.5 | 0.150 | 2162 |
| B (Hardwood) | 256 | 155 | 294 | 12.9 | 60.0 | 0.155 | 2162 |
| C (Hardwood) | 258 | 155 | 297 | 13.1 | 58.7 | 0.160 | 2072 |
| D (Hardwood) | 255 | 155 | 292 | 12.7 | 60.7 | 0.152 | 2162 |
| E (Hardwood) | 257 | — | — | — | 63.7 | 0.127 | 1531 |
| F (Hardwood) | 255 | — | — | — | 62.6 | 0.128 | 1531 |
| G (Hardwood) | 253 | — | — | — | 64.0 | 0.125 | 1531 |
| H (Hardwood) | 258 | — | — | — | 62.8 | 0.129 | 1531 |
| J (Softwood) | 264 | 159 | 306 | 13.7 | 64.0 | 0.152 | 2162 |
| K (Softwood) | 265 | 159 | 308 | 14.0 | 64.0 | 0.152 | 2162 |
| L (Softwood) | 263 | 159 | 306 | 14.0 | 63.6 | 0.152 | 2162 |
| M (Softwood) | 263 | 159 | 307 | 14.3 | 62.8 | 0.155 | 2162 |
| N (Softwood) | 263 | — | — | — | 62.5 | 0.133 | 1441 |
| P (Softwood) | 263 | — | — | — | 62.5 | 0.133 | 1441 |
| Q (Softwood) | 263 | — | — | — | 62.5 | 0.133 | 1441 |
| R (Softwood) | 265 | — | — | — | 62.3 | 0.134 | 1441 |

*1 lb./cu. ft. = 0.016 g/cc
**1 inch = 2.54 cm
***1 p.s.i. = 6.897 kPa

EXAMPLE 2

Four 2"×5" samples of each hardboard produced from mats acetylated by the method of this invention as described in Example 1 and from the non-acetylated mats cited as controls in Example 1 were subjected to an accelerated aging test in which the following cycle is repeated five times:

1. 3 hours soaking in water being heated from room temperature to boiling point;
2. 21 hours at freezing temperature;
3. 3 hours at 210° F. (98.9° C.);
4. 1 hour in boiling water;
5. 20 hours at 210° F.

After five cycles, the modulus of rupture (MOR) was determined by testing two samples of each board and the internal bond strength (IB) was measured by testing the other two. The MOR (uncorrected) and IB of hardboard which had not been subjected to the aging test were also measured. The average for each pair is given in Table II. The symbols MD and CD indicate whether the MOR was measured in the machine direction or cross direction. The hardboard samples are identified in accordance with Table I.

TABLE II

| Hardboard Sample | MD or CD | MOR (p.s.i.) Aging Before | MOR (p.s.i.) Aging After | Average of MD & CD | IB (p.s.i.) Aging Before | IB (p.s.i.) Aging After |
| --- | --- | --- | --- | --- | --- | --- |
| A | MD | 8109 | | | 204 | |
| | | | | 7727 | | |
| C | CD | 7346 | | | 236 | |
| B | MD | | 5869 | | | 87 |
| | | | | 5921 | | |
| D | CD | | 5972 | | | 155 |
| E | MD | 8826 | | | 232 | |
| | | | | 8612 | | |
| G | CD | 8397 | | | 294 | |
| F | MD | | 3884 | | | 20 |

TABLE II-continued

| Hardboard Sample | MD or CD | MOR (p.s.i.) Aging Before | MOR (p.s.i.) Aging After | Average of MD & CD | IB (p.s.i.) Aging Before | IB (p.s.i.) Aging After |
| --- | --- | --- | --- | --- | --- | --- |
| | | | | 3651 | | |
| H | CD | | 3418 | | | 35 |
| J | MD | 10440 | | | 437 | |
| | | | | 9838 | | |
| L | CD | 9237 | | | 222 | |
| K | MD | | 6266 | | | 92 |
| | | | | 7006 | | |
| M | CD | | 7746 | | | 156 |
| N | MD | 7768 | | | 185 | |
| | | | | 7689 | | |
| Q | CD | 7610 | | | 144 | |
| P | MD | | 2814 | | | 16 |
| | | | | 2361 | | |
| R | CD | | 1908 | | | 10 |

EXAMPLE 3

Samples of a mixed hardwood fiber mat measuring 4½"×4½"×½" (11.4 cm.×11.4 cm.×1.3 cm.) and weighing about 45–46 grams are coated on the top and bottom surfaces with acetic anhydride promptly after being substantially dried at 250° F. for 1 hour. Each sample mat is wrapped in aluminum foil and the foil wrapping is sealed. The wrapped mats are heated at the temperature and for the period of time indicated in Table III and then unwrapped to allow acetic acid and residual anhydride to evaporate while the mat is held for 2 hours at 250° F. The amount of anhydride placed on each mat, as percent of dry mat weight, the apparent acetyl content and the theoretical acetyl content are also given in Table III.

To compare the direct application method of this invention with a vapor phase method for acetylating mats of wood fibers, Table III includes the conditions imposed and the results obtained when mat samples of the size, weight and composition described in Example 3 are placed in a foil bag in a position overlying a quantity of acetic anhydride resting at the bottom of the bag. Care is taken so that the mats do not contact the liquid anhydride while the bag is sealed and placed in an oven.

Acetylation by the direct application method is indicated by D.A. in Table III and the vapor phase method is indicated by V.P.

TABLE III

| No. | Method | Time Minutes | Amount A.A. (%) | Acetyl Content (%) Apparent | Theory |
|---|---|---|---|---|---|
| | Temperature: 250° F. |
| 1 | D.A. | 30 | 67 | 13.2 | 20 |
| 2 | D.A. | 30 | 66 | 14.7 | 20 |
| 3 | V.P. | 30 | 65 | 5.4 | 20 |
| 4 | V.P. | 30 | 65 | 6.0 | 20 |
| 5 | D.A. | 60 | 65 | 14.6 | 20 |
| 6 | D.A. | 60 | 67 | 14.5 | 20 |
| 7 | V.P. | 60 | 65 | 6.0 | 20 |
| 8 | V.P. | 60 | 65 | 6.0 | 20 |
| 9 | D.A. | 90 | 66 | 16.1 | 20 |
| 10 | D.A. | 90 | 65 | 15.4 | 20 |
| 11 | V.P. | 90 | 65 | 4.5 | 20 |
| 12 | V.P. | 90 | 65 | 5.6 | 20 |
| 13 | D.A. | 30 | 114 | 13.6 | 30 |
| 14 | D.A. | 30 | 113 | 13.6 | 30 |
| 15 | V.P. | 30 | 117 | 10.0 | 30 |
| 16 | V.P. | 30 | 114 | 3.9 | 30 |
| 17 | D.A. | 60 | 114 | 15.6 | 30 |
| 18 | D.A. | 60 | 112 | 15.2 | 30 |
| 19 | V.P. | 60 | 116 | 4.0 | 30 |
| 20 | V.P. | 60 | 113 | 7.4 | 30 |
| 21 | D.A. | 90 | 117 | 15.9 | 30 |
| 22 | D.A. | 90 | 113 | 15.6 | 30 |
| 23 | V.P. | 90 | 112 | 6.4 | 30 |
| 24 | V.P. | 90 | 114 | 7.5 | 30 |
| | Temperature: 300° F. |
| 25 | D.A. | 30 | 66 | 13.5 | 20 |
| 26 | D.A. | 30 | 65 | 13.7 | 20 |
| 27 | V.P. | 30 | 67 | 5.9 | 20 |
| 28 | V.P. | 30 | 66 | 5.1 | 20 |
| 29 | D.A. | 60 | 65 | 14.6 | 20 |
| 30 | D.A. | 60 | 66 | 14.6 | 20 |
| 31 | V.P. | 60 | 66 | 3.0 | 20 |
| 32 | V.P. | 60 | 66 | 7.5 | 20 |
| 33 | D.A. | 90 | 65 | 14.8 | 20 |
| 34 | D.A. | 90 | 66 | 15.4 | 20 |
| 35 | V.P. | 90 | 65 | 14.7 | 20 |
| 36 | V.P. | 90 | 65 | 8.7 | 20 |
| 37 | D.A. | 30 | 112 | 14.5 | 30 |
| 38 | D.A. | 30 | 112 | 13.8 | 30 |
| 39 | V.P. | 30 | 113 | 3.8 | 30 |
| 40 | V.P. | 30 | 112 | 5.3 | 30 |
| 41 | D.A. | 60 | 114 | 17.0 | 30 |
| 42 | D.A. | 60 | 112 | 15.7 | 30 |
| 43 | V.P. | 60 | 114 | 15.0 | 30 |
| 44 | V.P. | 60 | 114 | 10.3 | 30 |
| 45 | D.A. | 90 | 114 | 16.6 | 30 |
| 46 | D.A. | 90 | 112 | 16.8 | 30 |
| 47 | V.P. | 90 | 114 | 3.8 | 30 |
| 48 | V.P. | 90 | 113 | 5.3 | 30 |

EXAMPLE 4

A mixed hardwood fiber pulp (no oak) is formed into two mats by a wet-felting process: one with and one without the addition of tung oil as a binder and ferric sulfate as a precipitant to the aqueous slurry of fibers. In the case of the slurry containing the binder and precipitant, the pH of the slurry is adjusted to about 4.3 with sulfuric acid and the dried mats contain 0.7% tung oil and 0.5% ferric sulfate.

Each mat is heated at 250° F. for 1 hour to substantial dryness and then coated on both faces with acetic anhydride so that the coating weight is about 60% of the dry mat weight. The mats are wrapped tightly in aluminum foil and heated at 250° F. for 1 hour and then unwrapped and heated for another 2 hours at 250° F. to drive off by-product acetic acid and residual anhydride. The apparent acetyl content of both mats is within the 12 to 13 percent range. The additive-containing mat is designated 4-B and the one without additives is designated 4-NB in Table IV below.

In order to compare the mat and hardboard of the instant invention with those produced from acetylated bulk fiber, a stock of acetylated fiber was prepared batchwise. In each batch, 250 grams of dry fibers of mixed hardwoods (no oak) were placed loosely in aluminum foil envelopes and acetic anhydride (140 mls. or about 151 grams) was distributed throughout the bulk by spraying increments of the total amount of anhydride onto the fiber as a fine mist and tumbling the fibers between increments and after the full amount had been applied. The envelopes were then sealed and heated at 250° F. for 2 hours. The treated mass of fibers was then dried in a ventilated oven for 2 hours at 250° F. A total 7200 grams of acetylated fiber having an average apparent acetyl content of 13.7% was prepared.

The dried fiber mass contained a multitude of hard lumps which could not be dispersed with the usual propeller type of mixture; a hydropulper had to be used to disperse the lumps before the acetylated fibers could be slurried prior to the formation of a mat.

The acetylated fiber was formed into two mats, one with and one without binder and binder precipitant by the wet-felting procedure as in Example 4. The dried mats are very soft and weak; gentle handling is required, therefore, to avoid breakage. The mat containing binder is designated AFB and the other is AFNB.

The acetylated mats of Example 4 and the mats formed from acetylated fiber are each pressed between platens at a temperature between 475° F. and 505° F. and a pressure of 2722 p.s.i. The hardboard made from mat 4-B has an average thickness of 0.15 inch and an average density of 70 lbs./cu. ft.; that made from 4-NB has an average thickness of 0.16 inch and an average density of 65 lbs./cu. ft. The hardboard made from mat AFB has an average thickness of 0.14 inch and an average density of 65 lbs./cu. ft. while that made from mat AFNB has an average thickness of 0.13 inch and an average density of 67 lbs./cu. ft. Several specimens were cut from each hardboard for physical testing. The test results are given in Table IV wherein MOE, WA and TS stand for modulus of elasticity, water absorption, and thickness swelling, respectively.

TABLE IV

| Hardboard Origin | MOR* (p.s.i.) | IB (p.s.i.) | MOE | % WA | % TS |
|---|---|---|---|---|---|
| Mat 4-B | 9609(1) 10470(2) | 416 | 743,493 | 8.8 | 5.0 |
| Mat 4-NB | 9113(1) 6973(2) | 177 | 570,383 | 32.0 | 9.6 |
| Mat AFB | 8662(1) 7423(2) | 437 | 616,636 | 20.5 | 7.8 |
| Mat AFNB | 7599(1) 6256(2) | 263 | 548,050 | 28.8 | 10.4 |

*Corrected to density = 67 lbs./cu. ft.
(1)Initial value
(2)After 1 cycle: bone dry to 70° F. & 50% R.H. to 90° F. & 90% R.H. to 70° F. & 50% R.H.

The reason for the superior properties of the mat and hardboard produced by the method of this invention when compared with the products from the acetylation of bulk fiber is not fully understood. It may be that the hydroxyl groups on the fiber surfaces which are necessary for the hydrogen bonding of contiguous fibers during formation of a mat are more accessible during acetylation of the bulk fibers whereas the hydroxyl groups already linked by hydrogen bonds in the preformed mat are not lost during acetylation of the mat.

The hardboard of this invention may be bent while still hot from the pressing operation into loops, spirals, twists and other acute curvilinear shapes. Even after being cooled to room temperature, it may be shaped or re-shaped after being heated again to about 400° F. or higher. The curved shapes retain nearly all of their curvature after prolonged soaking in water and much of that which is lost is regained upon drying.

A measure of acute curvilinearity of the shaped hardboard articles of this invention is given by the data in Table V and the equation which is derived from it by the least squares method.

EXAMPLE 5

Several mats are softwood fibers are acetylated by the method of this invention at 250° F. for 90 minutes. The apparent acetyl content of the mats is within the 15 to 17% range. Hardboards of various thicknesses and densities but each measuring 4"×12" are pressed from said mats at 485 to 495° F. for 120 seconds. While still hot from the press, each board is bent by hand until the first evidence of failure is observed. The shape of the curved boards is maintained by placing them in a rack while they cool prior to measurement of the radius of the curve achieved. The thickness, density and radius (to the nearest ⅛ inch) are given in Table V.

TABLE V

| Board No. | Thickness (inch) | Density lb/cu. ft. | Radius (⅛" units) |
|---|---|---|---|
| 1 | 0.0585 | 79.6 | 4 |
| 2 | 0.0597 | 75.6 | 4 |
| 3 | .0602 | 77.2 | 4 |
| 4 | .0613 | 75.8 | 5 |
| 5 | .0616 | 74.8 | 4 |
| 6 | .0619 | 71.9 | 4 |
| 7 | .0626 | 76.4 | 4 |
| 8 | .0641 | 74.9 | 3 |
| 9 | .0653 | 74.8 | 5 |
| 10 | .0664 | 70.7 | 4 |
| 11 | .0669 | 72.0 | 6 |
| 12 | .0689 | 69.4 | 5 |
| 13 | .0707 | 69.0 | 7 |
| 14 | .0975 | 77.6 | 7 |
| 15 | .0994 | 76.8 | 6 |
| 16 | .1016 | 77.9 | 6 |
| 17 | .1028 | 76.2 | 5.5 |
| 18 | .1038 | 72.3 | 8 |
| 19 | .1048 | 76.9 | 6 |
| 20 | .1066 | 77.4 | 8 |
| 21 | .1084 | 73.1 | 10 |
| 22 | .1087 | 75.9 | 5 |
| 23 | .1108 | 78.0 | 5 |
| 24 | .1140 | 73.0 | 8 |
| 25 | 0.1203 | 82.4 | 9 |
| 26 | 0.1347 | 77.9 | 12 |
| 27 | .1408 | 75.9 | 11 |
| 28 | .1465 | 75.0 | 11 |
| 29 | .1473 | 76.9 | 10 |
| 30 | .1488 | 76.7 | 12 |
| 31 | .1514 | 75.4 | 15 |
| 32 | .1525 | 74.9 | 11 |
| 33 | .1550 | 70.9 | 11 |
| 34 | .1590 | 70.9 | 11 |
| 35 | .1593 | 69.9 | 11 |
| 36 | .1617 | 71.1 | 11 |
| 37 | .1817 | 73.9 | 17 |
| 38 | .1858 | 76.5 | 16 |
| 39 | .1864 | 74.4 | 15 |
| 40 | .1894 | 76.1 | 16 |
| 41 | .1961 | 76.0 | 15 |
| 42 | .1967 | 73.9 | 21 |
| 43 | .2017 | 68.9 | 17 |
| 44 | .2059 | 70.5 | 18 |
| 45 | .2066 | 69.3 | 17 |
| 46 | .2079 | 73.2 | 19 |
| 47 | .2160 | 68.2 | 17 |
| 48 | .2179 | 69.0 | 17 |

It is apparent from Table V that the density of the hardboard has little effect on the curvature which may be obtained by bending the thermoplastic hardboard of this invention. The relationship between the hardboard's thickness and the degree of curvature attainable is expressed by an equation derived from the date in Table V by the least squares method. Said equation is:

$$y = b + m \ln x$$

wherein
y = thickness
x = radius (in units of ⅛ inch)
b = −0.0661
m = 0.0905 and the coefficient of correlation is 0.94915.

Thus, the minimum radius attainable when boards of various thicknesses are bent may be calculated by solving the equation for x. For example, a ⅛" thick board may be bent into loops, spirals and other curved shapes having a minimum radius of about 1 inch; for a 1/16" board, the radius will be about ½ inch; a ¼" board may be bent to a radius of about 4 inches; and the minimum radius of a curved ½" board will be about 6½ inches.

The products of both long term and short term exposure of mats to the vapors of acetic anhydride were compared with those of this invention.

In the first case, two mats of softwood fibers were dried and placed in an aluminum foil-lined box over a pan containing acetic anhydride. The box was sealed and placed in an oven at about 250° F. for a total of 13 hours. The mats were dried at about 250° F. to remove all acetic acid and residual anhydride. The apparent acetyl content of the mat, as measured by the ratio of the weight gain to the final weight, was about 17%. A hardboard pressed from one such mat to a thickness of about 0.13" and a density of about 66 lbs./cu. ft. had an internal bond strength of 80 p.s.i. When the same kind of mat is acetylated by the method of this invention to an apparent acetyl content of 17.6% and pressed to form a hardboards, the internal bond strength of one having a density of about 70 lbs./cu. ft. is 334 p.s.i. and that of another having a density of about 68 lbs./cu. ft. is 252 p.s.i.

A 4"×12"×⅛" piece of hardboard made from the other long term vapor phase acetylated mat was bent immediately after being taken out of the press at 480°-490° F. The board could be bent only into an arc having its ends about 8½" apart before splitting occurred.

To determine whether a shorter term vapor phase acetylated mat could be pressed into a thermoplastic hardboard, mats of the same mixed softwood fibers were heated at 240° F. to 260° F. in a foil-lined and sealed box while the mats were suspended above a pan of acetic anhydride for the periods of time indicated in Table VI. Hardboards measuring 4"×13"×⅛" were pressed from the mats at 480°-490° F. for 75 seconds. Immediately after being removed from the press, each board was bent until failure occurred. Failure is splitting of the board, that is, the separation of fibers on the convex side of the curved board. The results are compared in Table VI with those obtained when hardboards made from similar mats but acetylated by the method of this invention where bent upon being removed from the press at 480°-490° F. The thermoplasticity of the boards is measured by the distance between the ends of the board at the maximum curvature of a board when splitting occurs; the shorter the distance, the more thermoplastic. At least two samples of each board were bent, thus more than one value for the distance is recorded in the table.

TABLE VI

| Mat Acetylation Method | Time (Minutes) | Apparent Acetyl Content (%) | Distance (Inches) |
| --- | --- | --- | --- |
| None | — | — | 10.1, 10.5 |
| Vapor Phase | 60 | 0.8 | 10.1, 10.3 |
| Vapor Phase | 90 | 4.7 | 8.1, 8.3 |
| Vapor Phase | 120 | 13* | 5.6, 7.8, 8.8 |
| Direct Application | 60 | 15 | 3.5, 3.7 |

*Corners of mat absorbed liquid anhydride from pan.

During the pressing of the mat which had been acetylated for 120 minutes by the vapor phase method, the corners became black and brittle and somehwat disintegrated.

The hardboard of this invention may be formed into articles of furniture such as TV and radio cabinets, chairs and tables for lawn, patio or indoor use, stadium seats and the like. It also may be formed into luggage shells, automobile dash boards and headers, and bathtub/shower stall enclosures. Cylindrical articles such as mailing tubes and packaging tubes may also be formed from the thermoplastic hardboard. Pallets and corner protecting cups for products being transported may also be made from this hardboard. Other products for which it is especially adapted include roofing and siding shingles, exterior trim, wall tile, and structural members such as a substrate and/or back cover for terrestrial solar cell modules. Very thin hardboard may substitute for wood veneer or wallpaper. The hardboard is well adapted for use as a backerboard during manufacture of printed circuit boards.

While the invention has been described with reference to certain specific embodiments, it will be recognized by those skilled in the art that variations are possible which do not depart from the spirit and scope of the claims.

What is claimed is:

1. A method for acetylating wood fiber comprising the steps of forming said wood fiber into a substantially dry mat, coating the mat with from about 5% to about 70% by volume of acetic anhydride, enclosing the mat in a sealed space, heating the enclosed mat at a temperature of from about 150° F. to about 300° F. for a period of from about 20 minutes to about 120 minutes, and removing by-product acetic acid and residual anhydride.

2. A method for preparing an acetylated wood fiber mat comprising the steps of coating a substantially dry wood fiber mat with from about 35% to about 120% by weight of acetic anhydride, enclosing the coated mat in a sealed space, heating the enclosed mat at a temperature of from about 150° F. to about 300° F. for from about 20 minutes to about 120 minutes, and removing by product acetic acid and residual anhydride.

3. The method of claim 1 wherein the amount of acetic anhydride is from about 60% up to about 80% of the dry weight of the mat.

4. The method of claim 2 wherein the amount of acetic anhydride is from about 60% to about 80% of the dry weight of the mat.

5. The method of claim 1 wherein the temperature is from about 225° F. to about 275° F.

6. The method of claim 2 wherein the mat is heated for a period of from about 30 minutes to about 90 minutes.

7. A method for preparing a thermoplastic hardboard comprising the steps of coating a substantially dry wood fiber mat with from about 35% to about 120% by weight of acetic anhydride, enclosing the coated mat in a sealed space, heating the enclosed mat at a temperature of from about 150° F. to about 300° F. for from about 20 minutes to about 120 minutes, drying the acetylated mat, and compressing said mat at a temperature of from about 400° F. to about 500° F.

8. The method of claim 7 wherein the mat is compressed to a density ranging from about 31 to about 80 pounds per cubic foot.

9. The method of claim 7 wherein the amount of acetic anhydride is from about 60% to about 80% of the dry weight of the mat and the enclosed mat is heated at about 250° F. for from about 60 minutes to about 90 minutes.

* * * * *